United States Patent [19]

Noguchi

[11] Patent Number: 4,591,905
[45] Date of Patent: May 27, 1986

[54] COLOR IMAGE DATA PROCESSING DEVICE FOR CORRECTING RED GHOSTS OF BLACK IMAGES

[75] Inventor: Akio Noguchi, Kanagawa, Japan

[73] Assignee: Fuji Xerox Co., Ltd., Tokyo, Japan

[21] Appl. No.: 571,168

[22] Filed: Jan. 16, 1984

[30] Foreign Application Priority Data

Jan. 14, 1983 [JP] Japan .................................. 58-3346

[51] Int. Cl.[4] .............................................. H04N 1/46
[52] U.S. Cl. ......................................... 358/75; 358/78
[58] Field of Search ................................ 358/75, 78, 80

[56] References Cited

U.S. PATENT DOCUMENTS 4,510,524 4/1985 Kurata .................................. 358/75

FOREIGN PATENT DOCUMENTS 202175 12/1982 Japan .................................. 358/75

Primary Examiner—James J. Groody
Assistant Examiner—Randall S. Svihla
Attorney, Agent, or Firm—Sughrue, Mion, Zinn, Macpeak and Seas

[57] ABSTRACT

A color image data processing device in which the color for a target picture element is corrected in accordance with the combination of colors obtained for peripheral picture elements. The peripheral picture elements are arranged around the target picture element in a predetermined relationship. A memory outputs a signal which represents a color for the target picture elements with the signal being determined by the combination of colors obtained for the peripheral picture elements. A logic circuit receives the signal from the memory and logically combines the signal with a second signal obtained from the target picture element which represents a color for the target picture element. The logic circuit then outputs a corrected color signal determined by the logical operations on its two input signals. In the preferred embodiment, the memory output signal can override the detected color for the target picture element when the detected color is red but cannot override a detected black color for the target picture element, thereby allowing correction of red ghosts of black picture elements.

7 Claims, 12 Drawing Figures

FIG. 6

| | ROM ADDRESS | a | b | c | d | e | f |
|---|---|---|---|---|---|---|---|
| BLACK SIGNAL INFORMATION | A0 | 0 | 1 | 0 | 0 | 1 | 0 |
| | A1 | 0 | 0 | 0 | 0 | 0 | 0 |
| | A2 | 0 | 0 | 0 | 0 | 0 | 0 |
| | A3 | 1 | 0 | 0 | 0 | 1 | 0 |
| | A4 | 1 | 0 | 0 | 0 | 1 | 0 |
| | A5 | 0 | 0 | 0 | 0 | 1 | 1 |
| RED SIGNAL INFORMATION | A6 | 1 | 0 | 0 | 0 | 0 | 1 |
| | A7 | 0 | 1 | 0 | 1 | 1 | 1 |
| | A8 | 1 | 1 | 0 | 1 | 1 | 1 |
| | A9 | 0 | 1 | 0 | 1 | 0 | 0 |
| | A10 | 0 | 1 | 0 | 0 | 0 | 0 |
| | A11 | 1 | 0 | 1 | 0 | 0 | 0 |
| BLACK | O1 | 1 | 1 | 0 | 0 | 1 | 1 |
| RED | O2 | 0 | 0 | 1 | 1 | 0 | 0 |

COLOR IMAGE DATA PROCESSING DEVICE FOR CORRECTING RED GHOSTS OF BLACK IMAGES

FIELD OF THE INVENTION

This invention relates to a color image data processing device for correcting color-separated color signals in a reading device which reads a color picture for every picture element to perform color separation.

BACKGROUND OF THE INVENTION

In a color copying machine or a color facsimile system using photo-electric cconversion elements such as CCD's, optical mirrors and dichroic mirrors are employed to read a color picture in different wavelength ranges. A plurality of image signals thus read are processed by a color separation circuit, so as to provide desired image signals which have been color-separated. The color picture is processed for every picture element as described above; however, it is not always true that the color-separated color signals exactly represent the colors of the respective picture elements of the color picture. The reasons for this are as follows:

(1) The chromatic aberration of the image forming lens.

(2) In the case where a plurality of reading systems are employed, these reading systems are different from one another in the magnifications of the central and peripheral portions of the lens.

(3) When a plurality of reading systems are used, the optical axes of the reading systems are not in alignment with one another, and the remaining systems differ in the focal length of the lens.

(4) When analog data outputted by the photoelectric conversion element is binary-encoded, the image signals are different in threshold level.

Because of the above-described mechanical, physical or optical reasons, even if excellent optical components are arranged with high accuracy and with ordinary resolution, a ghost on the order of two bits maximum may be formed in the main scanning direction and a ghost on the order of one bit may be formed in the auxiliary scanning direction. The term "ghost" is intended to mean a region of data R (representing red) which, as shown in FIG. 1, is formed on the boundary between the region of data B (representing black) and the region of data W (representing white), on the output side of a reading device adapted to read black and red. In this case, the original color picture is shown in FIG. 2. If the color image data is as shown in FIG. 2, then the color image data has been correctly read and no ghost has been formed.

If the ghost is formed, then not only are images recorded or displayed on a display unit with low quality color image data, but also an image editing device may recognize the ghost as an actual line or line drawing, thus making errors in the editing operation. All the thin lines outputted by the reading device may be eliminated as ghosts. However, if this method is employed, then almost all the effective image data are removed, which provides worse results.

SUMMARY OF THE INVENTION

In view of the foregoing, an object of this invention is to provide a color image data processing device which can effectively remove ghosts from color-separated color signals.

A color image data processing device according to the invention comprises: means for extracting out of the color-separated color signals of the picture elements the color signals of peripheral picture elements which are arranged around a picture element which is to be corrected (hereinafter referred to as "a target picture element"); a semiconductor memory device which has stored data for selecting colors for the target picture elements respectively in correspondence to the patterns of the color signals of the peripheral picture elements; and a logic circuit for subjecting the color signal of the target picture element which is not corrected yet and the output of the semiconductor memory device to logical operation to provide a color signal which has been corrected. With the color signals of the peripheral picture elements surrounding the target picture element as address inputs, the logic circuit utilizes the color signal of the target picture element which is outputted by the semiconductor memory device and the color signal of the target picture element which is not corrected yet, to form a corrected color signal.

DETAILED DESCRIPTION OF THE DRAWINGS

FIG. 6 is an explanatory diagram showing addresses in a read-only memory with signals outputted.

DETAILED DESCRIPTION OF THE INVENTION

Figure 3:
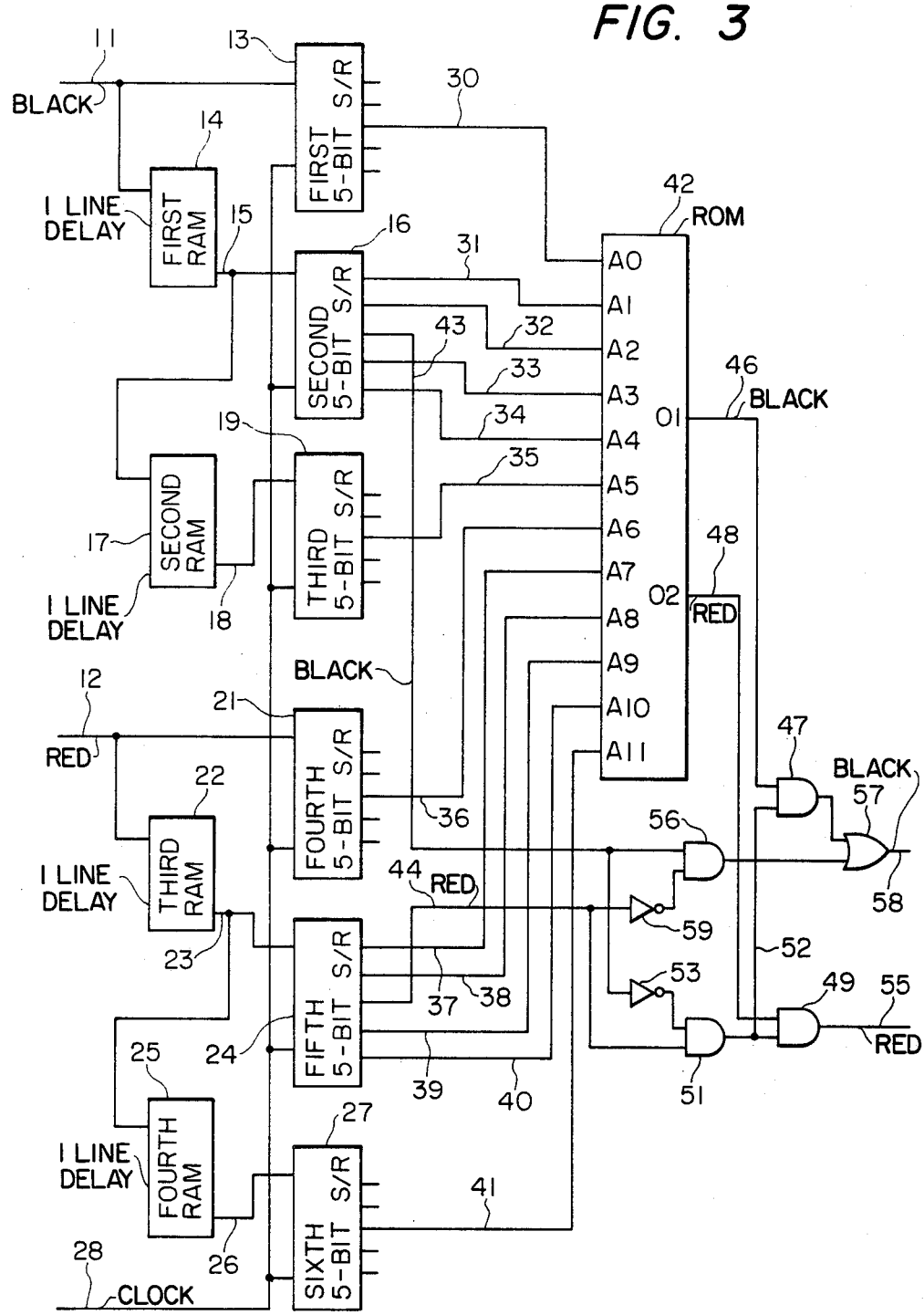
FIG. 3 is a block diagram of a color image data processing device according to one embodiment of this invention.

FIG. 3 shows a color image data processing device which is used in a reading device adapted to read red and black. The reading device receives a black signal (color signal) 11 and a red signal (color signal) 12 from a color separation circuit (not shown). The black signal 11 represents black for a picture element when it is at a logic level "1", and it represents white when it is at a logic level "0". The red signal 12 represents red for a picture element when it is at a logic level "1" and it represents white when it is at a logic level "0". The black signal 11 is applied to a first 5-bit shift register 13, and to a first random access memory 14 where it is delayed one line. The black signal (15) thus delayed is applied to a second 5-bit shift register 16, and to a second random access memory 17 where it is further delayed one line. The black signal (18) which has been delayed two lines, as described above, is applied to a third 5-bit shift register 19. The red signal 12 is applied to a fourth 5-bit shift register 21, and to a third random access memory 22 where it is delayed one line. The red signal (23) thus delayed is applied to a fifth 5-bit shift register 24, and to a fourth random access memory 25 where it is delayed one line. The red signal (26) which has been delayed two lines, as described above, is supplied to a sixth 5-bit shift register 27. A clock signal 28 having a predetermined frequency is applied to the 5-bit shift registers 13, 16, 19, 21, 24 and 27. Signals 30 through 41 are taken from selected parallel signal output terminals of these shift registers as shown in FIG. 3, and are applied respectively to addresses A0–A11 of a read-only memory 42.

Figure 1:
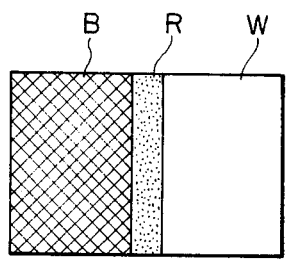
FIG. 1 is an explanatory diagram showing one example of color image data involving a ghost.
Figure 2:
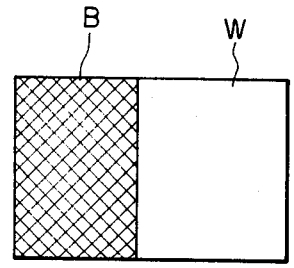
FIG. 2 is an explanatory diagram corresponding to that of FIG. 1, showing the original color picture data which is free from the ghost.
Figure 4:
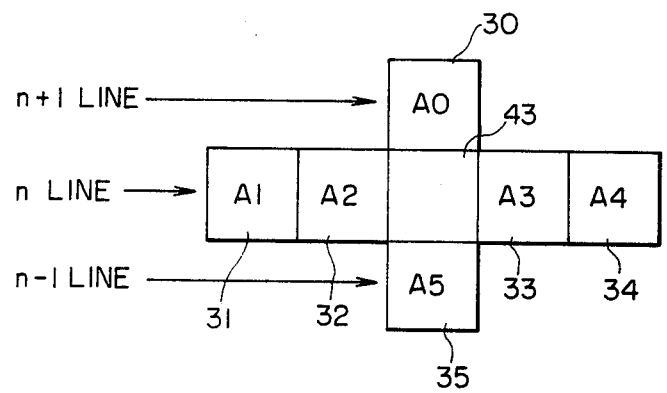
FIG. 4 is an explanatory diagram showing assignment of addresses to black peripheral picture elements with respect to a target picture element.
Figure 5:
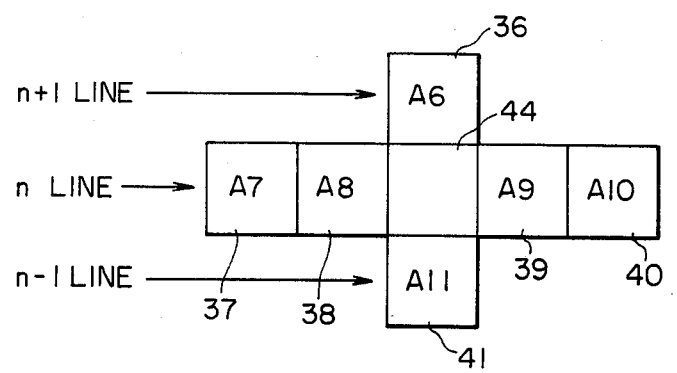
FIG. 5 is an explanatory diagram showing assignment of addresses to red peripheral picture elements with respect to a target picture element.

FIG. 4 shows the assignment of addresses to black peripheral picture elements with respect to a target picture element, and FIG. 5 shows assignment of addresses to red peripheral picture elements with respect to a target picture element. It is assumed that the target picture element is on the n-th line (n being an integer) in each case. With the first 5-bit shift register 13 to which the black signal 11 is applied undelayed, the signal 30 on the (n+1)-th line (which occurs one line later than the n-th line) which is delayed two bits is assigned to the address A0. With the second 5-bit shift register, the signals 31, 32, 33 and 34 on the n-th line which have been delayed zero, one, three and four bits, respectively, are assigned to the addresses A1, A2, A3 and A4, respectively. The signal 43, of the second 5-bit shift register 16, which has been delayed two bits, is the black signal of the target picture element. With the third 5-bit shift register 19 adapted to delay the black signal two lines, the signal 35 on the (n−1)-th line (which occurs one line line earlier than the n-th line) which has been delayed two bits is assigned to the address A5.

As is clear from the above description, the signals 30, 32, 33 and 35 represent the colors of four picture elements adjacent to the target picture element, and the other two signals 31 and 34 represent the colors of two picture elements which are on the same line as the target picture element and are two elements removed from the target picture element. A detailed description of FIG. 5 is not believed to be necessary, because it is fundamentally similar to that of FIG. 4. The signal 44 from the fifth 5-bit shift register 24, which has been delayed two bits, is the red signal of the target picture element.

FIG. 6 shows the addresses A0 through A11 of the read-only memory 42 with signals outputted through a black signal output terminal 01 and a red signal output terminal 02 of the memory 42. The signals which are outputted in cases a, b, c, d, e and f in FIG. 6 will be described with reference to FIG. 7.

Figure 7A:
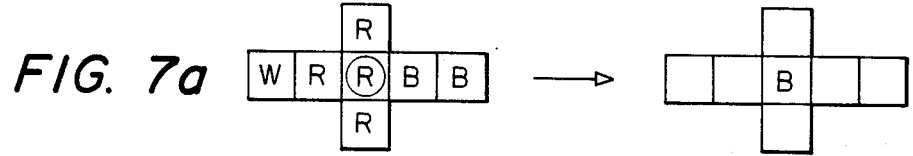
FIGS. 7a-7f are an explanatory diagrams showing the relations of various patterns with color signals determined from these patterns.

When the addresses A0 through A11 are as indicated at a in FIG. 6, the color image data of the peripheral picture elements have a pattern as indicated in the left-hand half of FIG. 7a. In FIG. 7, reference characters R, W and B designate color image data representing red, white and black, respectively. When the color image data of the peripheral picture elements have the above-described pattern, the target picture element (R) is determined as data B representing black. This is based on the premise that, in the reading device equipped with the color image data processing device, (i) a ghost is formed within two bits in the main scanning direction, and (ii) a red ghost is formed when black is read, but no black ghost is formed when red is read.

Figure 7B:
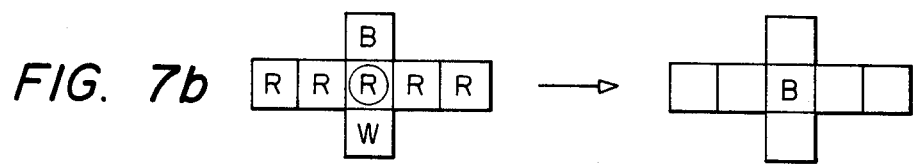

When the addresses A0 through A11 are as indicated at b in FIG. 6, the color image data of the peripheral picture elements have a pattern as indicated in the left-hand half of FIG. 7b. In this case, the target picture element (R) is determined as data B representing black. This is based on the premise that, in the reading device equipped with the color image data processing device, (iii) a ghost in the auxiliary scanning direction occurs within one bit.

Figure 7C:
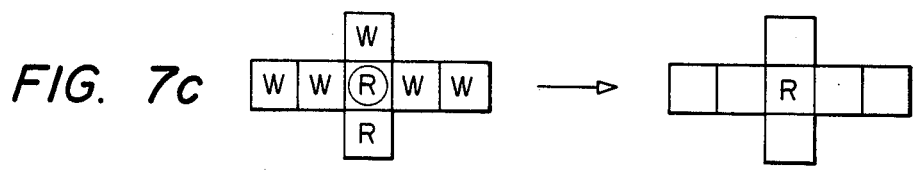

When the addresses A0 through A11 are as indicated at c in FIG. 6, the color image data of the peripheral picture elements have a pattern as indicated in the left-hand half of FIG. 7c. In this case, the target picture element (R) is determined as data R representing red. This is based on the premise that, as is apparent from the above-described premise, the ghost is only provided as a pattern in which black and red are adjacent. In other words, the premise in this case is that red color image data R adjacent to white color image data W is not the ghost of black color image data B. Sometimes the target picture element is finally determined as white color image data W by a subsequent logic circuit. In the stage of the read-only memory 42, red or black is selected for the aimed picture element, but white is not taken into consideration.

Figure 7D:
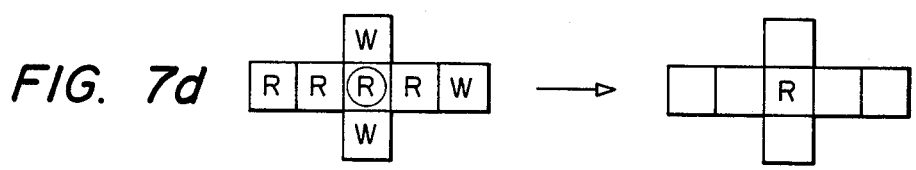
Figure 7E:
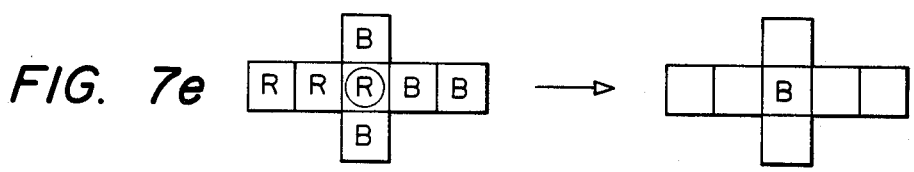
Figure 7F:
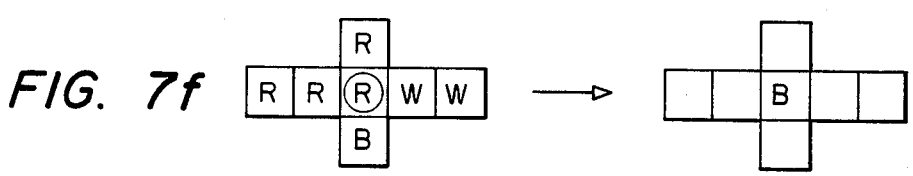

It is obvious that when the addresses A0 through A11 have patterns as indicated at d, e and f in FIG. 6, the color image data of the pheripheral picture elements have patterns as indicated in the left-hand halves of FIGS. 7d, 7e and 7f, respectively. In these cases the target picture element (R) is determined to be data R, B and B, respectively.

A black selection signal 46 provided at the output terminal 01 of the read-only memory 42 is supplied to one of the input terminals of a black determining 2-input AND circuit 47. A red selection signal 48 provided at the output terminal 02 of the memory 42 is applied to one of the input terminals of a red determining 2-input AND circuit 49. The output signal 52 of a 2-input AND circuit 51 is applied to the other input terminals of these AND circuits 47 and 49. The red signal 44 of the target picture element is applied to one input terminal of the AND circuit 51 and the black signal 43 is applied through an inverter 53 to the other input terminal of the AND circuit 51.

Accordingly, when the red selection signal 48 represents red and the color signal of the picture element separated by the color separation circuit represents red, the AND circuit 49 outputs a red determination signal 55 which is at the logic level "1". This means that the target picture element has been determined to be red. In the other cases, the red determination signal 55 is set to the logical level "0". If, in this case, a black determination signal 58 outputted by an OR circuit 57 which receives the outputs of the AND circuit 47 and an AND circuit 56 is at the logical level "0", then the target picture element is determined to be white.

The red signal 44 of the target picture element is applied through an inverter 59 to one input terminal of the AND circuit 56, and the black signal 43 of the aimed picture element is applied to the other input terminal of the AND circuit 56. Accordingly, when the signal separated by the color separation circuit represents black, the black determination signal 58 is raised to the logic level "1" unconditionally, and the target picture element is finally determined to be black. On the other hand, when the output signal 52 of the AND circuit 51 is at the logic level "1" representing red and the black selection signal 46 is at the logic level "1" representing black, the black determination signal 58 is raised to the level "1". That is, even when the signal separated by the color separation circuit represents red, red is not decided by the red selection signal 48, thus the target picture element is finally determined to be black, and accordingly the ghost is eliminated. The following table generally indicates the principle of decision by color of the logic circuit which comprises the AND circuits 47, 49, 51 and 56, the OR circuit 57 and the inverters 53 and 59.

TABLE 1

| Color signal of target picture | Color signal of read-only memory | Color after correction |
|---|---|---|
| Black | Not applicable | Black |
| Red | Red | Red |
| Red | Black | Black |
| White | Not applicable | White |

The red determination signal 55 and the black determination signal 58 which have been determined by the logic circuit as described above are supplied, as corrected read signals, to a recording device or a display unit (not shown).

In the above-described embodiment, there is no premise that a black ghost is formed with respect to red and correction of the ghost is not carried out. The frequency of formation of such ghosts is so low that the correction may be omitted. It goes without saying, however, that such a correction may be carried out. While the embodiment has been described with reference to the case where red and black are read, the invention is not limited thereto or thereby.

As is apparent from the above description, according to the invention, the color signals for correction are stored in a semiconductor memory device such as a read-only memory. Accordingly, the correction results can be easily programmed to correspond with generated patterns of the peripheral picture elements. Since the color signals of the peripheral picture elements are used directly as address data for the semiconductor memory device, the address signals will correspond exactly to the patterns generated. Further, since the means used to generate the color signals corresponding to the patterns is a simple semiconductor memory device as described above, the device has a simplified circuit arrangement, and it is low in manufacturing cost and high in reliability.

I claim:

1. In a reading device for reading a color picture, said reading device including means for generating color signals each representing one of a plurality of colors of individual picture elements, said individual picture elements comprising a target picture element having a color represented by a first signal and a plurality of peripheral picture elements positioned around said target picture element in a predetermined relationship, each individual picture element of said plurality of peripheral picture elements having a color represented by a peripheral signal, a color image data processing device comprising:

correction means, responsive to a combination of said peripheral signals and said first signal, for outputting a corrected signal representing a corrected color for said target picture element, said correction means including memory means for receiving said peipheral signals and for outputting a second signal which represents a color for said target picture element.

2. A color image data processing device as claimed in claim 1, wherein said memory comprises:

a delay means for receiving said peripheral signals and outputting a delayed signal representing said combination of peripheral signals; and a read-only memory, receiving said delayed signal from said delay means as a memory address, for outputting said second signal.

3. A color image data processing device as claimed in claim 1, wherein said correction means further comprises a logic circuit means responsive to said first and second signals for outputting said corrected signal.

4. A color image data processing device as claimed in claim 3, wherein said plurality of colors comprises black, red and white.

5. A color image data processing device as claimed in claim 4, wherein said corrected signal represents black whenever said first signal represents black.

6. A color image data processing device as claimed in claim 4, wherein said corrected signal represents red when said first and second signals represent red, and represents black when said first signal represents red but said second signal represents black.

7. A color image data processing device as claimed in claim 4, wherein said corrected signal represents white whenever said first signal represents white.

* * * * *